Figure 1:
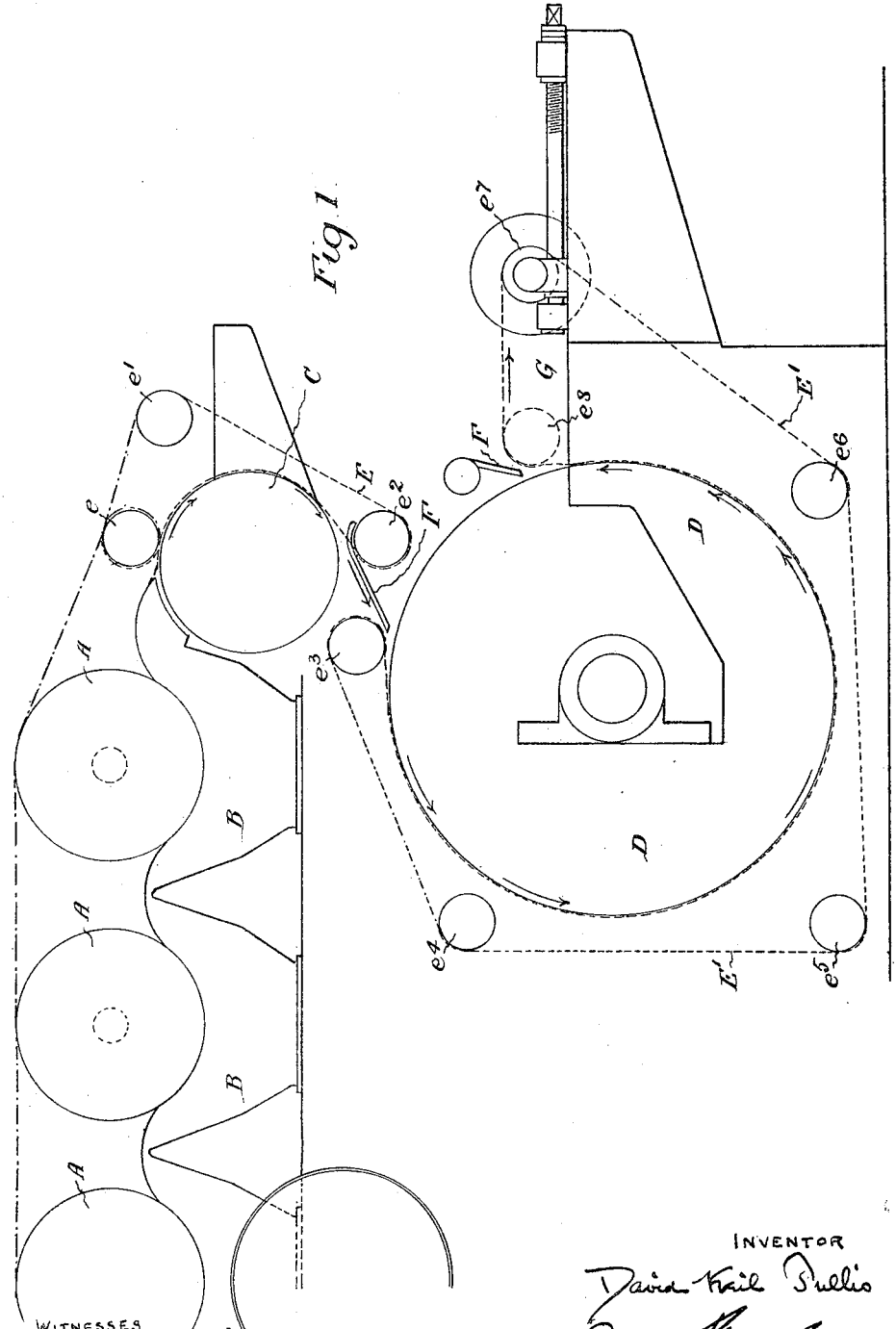

D. K. TULLIS.
IRONING MACHINE.
APPLICATION FILED FEB. 16, 1914.

1,132,290.

Patented Mar. 16, 1915.
2 SHEETS—SHEET 1.

WITNESSES
C. M. Sweeney
M. E. Rattoon

INVENTOR
David Krail Tullis
By
Attys

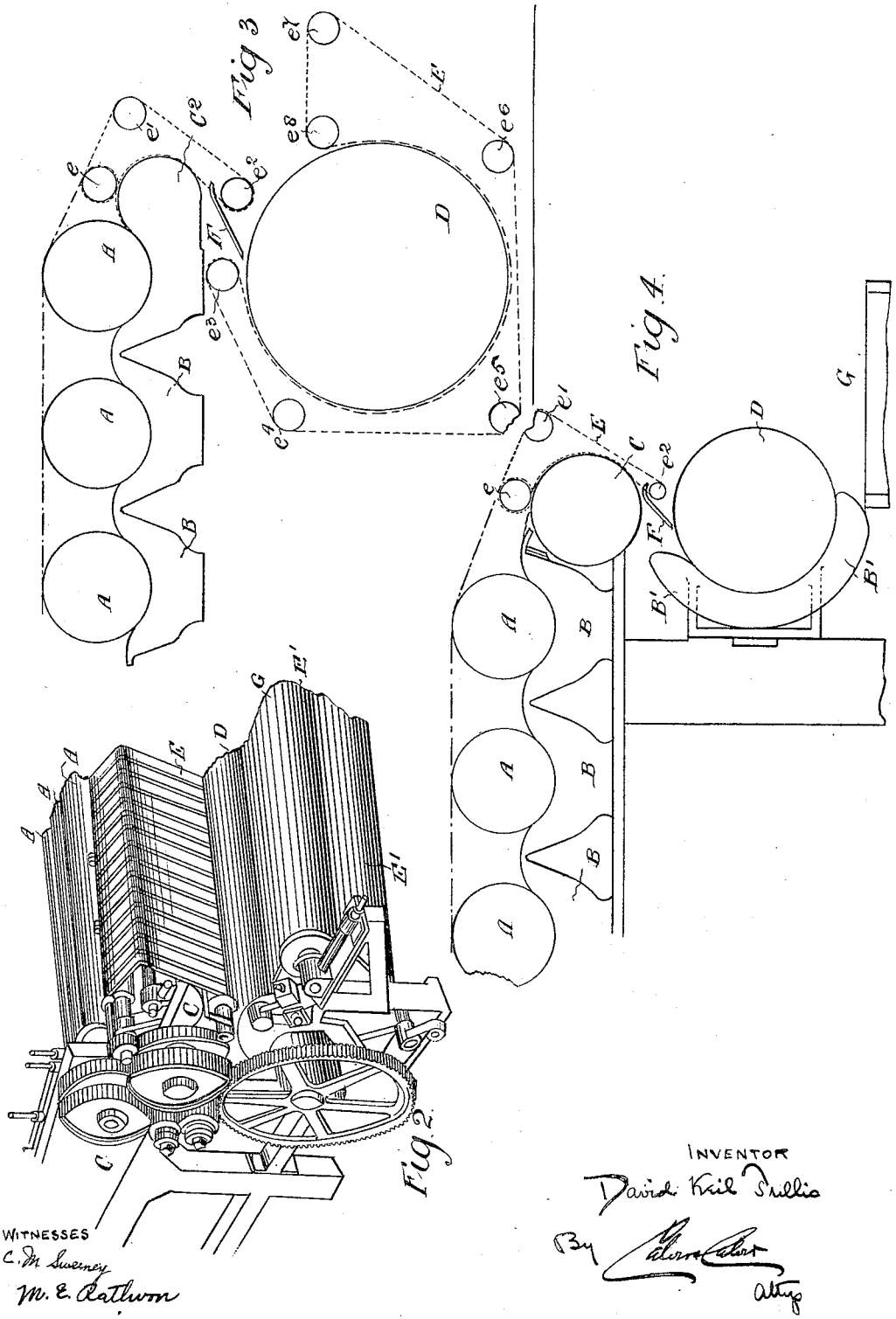

UNITED STATES PATENT OFFICE.

DAVID KEIL TULLIS, OF GLASGOW, SCOTLAND.

IRONING-MACHINE.

1,132,290.  Specification of Letters Patent.  Patented Mar. 16, 1915.

Application filed February 16, 1914. Serial No. 818,994.

*To all whom it may concern:*

Be it known that I, DAVID KEIL TULLIS, of 10 Eglinton Drive, Kelvinside, Glasgow, Scotland, engineer, have invented certain new and useful Improvements in Ironing-Machines, of which the following is a specification.

My invention relates to improvements in and connected with multiple roller ironing machines, and has for its object the conveying of fabrics or other goods after passing under a series of rollers and heated beds (or chests) to a large heated roller or rollers and heated beds (or chests) and thereby ironing and drying them quickly.

In carrying out my invention, I provide a single heated bed and roller, or a series of such, in conjunction with one or more polished steam heated rollers with endless bands and aprons and fingers for guiding the goods from one roller to another. The fabric is fed on to the first bed and passes under one or more rollers and beds, and from thence it is delivered on to a heated member or roller to which is fitted a series of bands for conveying the fabric to a large final roller upon which it is delivered by means of fingers or doffer plates located between the bands and coöperating therewith.

In order that my invention may be properly understood and readily carried into effect I have hereunto appended two sheets of drawings, of which—

Figure 1 is a diagrammatic side view of part of a multiple roller ironing machine embodying my improvements. Fig. 2 is a perspective view of the same. Fig. 3 is a view similar to Fig. 1 illustrating a modification in which the last of the heated beds is of circular formation and takes the place of the conveying roller therein shown. Fig. 4 is a further view similar to Fig. 1 illustrating a further modification comprising a combined final roller and steam heated bed made in accordance with and embodying my improvements, and all hereafter more fully referred to and described.

Referring to the drawings, the rollers which may be of any convenient number are marked A, the heated beds for said rollers are marked B, the band or conveying rollers C, the bands E and aprons $E^1$ respectively, the final or delivering heated rollers D, and the fingers or doffer plates leading the fabric from band rollers to the final or delivering rollers F.

According to my improvements, the goods under treatment are fed on to the first bed of a single or multiple ironing machine and pass between the roller or rollers A, and the bed or beds B, and thence they are delivered on to a heated roller C, which, as seen in Fig. 1, is mounted at a slightly lower level, and as seen more particularly in Fig. 2, is fitted with a series of bands E passing thereabout for conveying the fabric to a large final heated roller D, said goods passing between the roller C and bands E. The bands are carried upon rollers $e$, $e^1$, $e^2$, but may be differently disposed. The large roller D is provided with bands or preferably an apron $E^1$ carried on rollers $e^3$, $e^4$, $e^5$, $e^6$, $e^7$, $e^8$, and which also are subject to modification, which said bands or apron constitute the delivery table. Fingers or doffer plates F are fitted between the bands E at about the point where such bands descend on to the roller $e^2$ and are designed to lead the goods upon the heated roller D and deliver them to the table G in the usual way. The surface of the goods leaving the delivery or conveying roller C, to be finished on the large steam heated or final roller D, is reversed due to the position of the final roller D, over which they are caused to travel and into which they are directed by the fingers or doffer plates F aforesaid, in order that both sides shall receive the same gloss and finish.

Referring to the modification of my improvements, in place of the heated conveying roller C at end of machine, I may so form the end $C^2$ of the last bed of circular formation in which case the bands E for carrying the goods to the last heated roller, as shown in Fig. 3, would pass about such circular end. Referring to the further modification illustrated in Fig. 4, the final roller D, as shown in said figure, in lieu of being steam heated revolves within a heated bed $B^1$.

Claims.

1. In an ironing machine, the combination with a pair of ironing members, of a series of bands for conveying the goods to be treated from one of said members to the other, and a series of fingers or doffer plates between said bands for delivering said goods from said bands to said other member.

2. In an ironing machine, in combination, one or more rollers, one or more heated beds between which and said roller or rollers the goods to be treated pass, a heated member at the end of the machine to which said goods are delivered from said rollers and beds, a final roller, a series of bands passing over said heated member and between which and said member the goods pass, and a series of fingers or doffer plates between said bands for delivering said goods to said final roller.

3. In an ironing machine, in combination, one or more rollers, one or more heated beds between which and said roller or rollers the goods to be treated pass, a heated roller at the end of the machine to which said goods are delivered from said rollers and beds, a final roller, a series of bands passing over said heated roller and between which and said roller the goods pass, and a series of fingers or doffer plates between said bands for delivering said goods to said final roller.

In witness whereof I affix my signature in presence of two witnesses.

DAVID KEIL TULLIS.

Witnesses:
JOHN LIDDLE,
JOHN TRAIN LIDDLE.

Copies of this patent may be obtained for five cents each, by addressing the "Commissioner of Patents, Washington, D. C."